Nov. 5, 1935. J. J. SIGMAN 2,019,771
JUICE STRAINER
Filed May 6, 1933
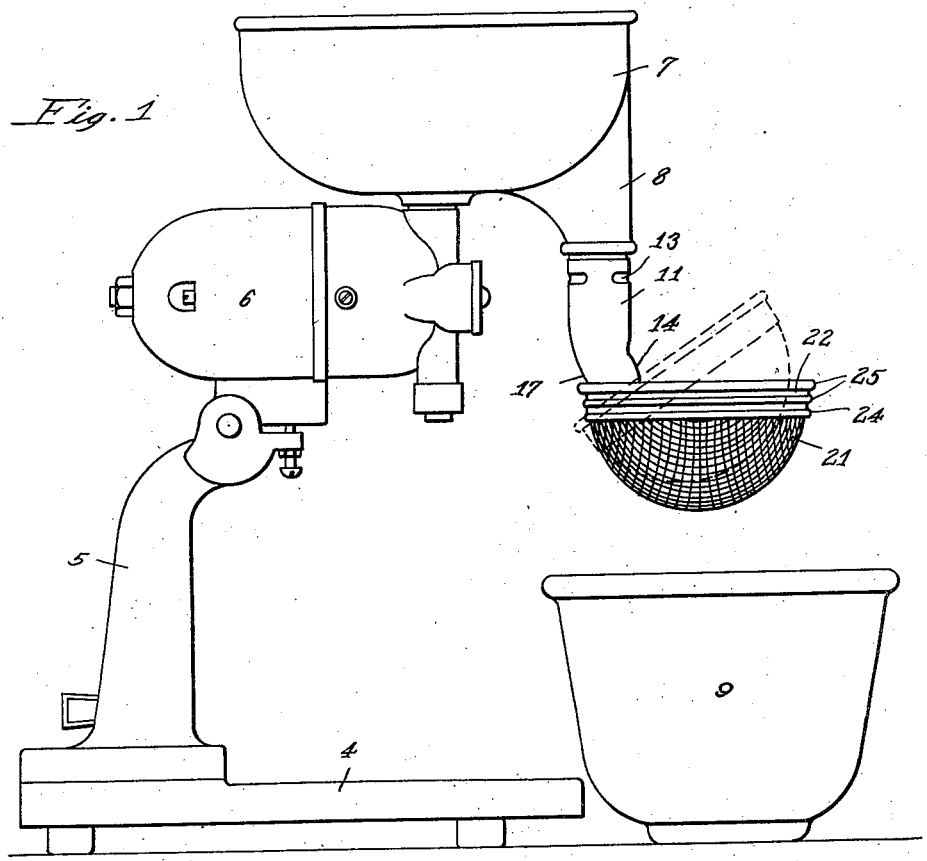
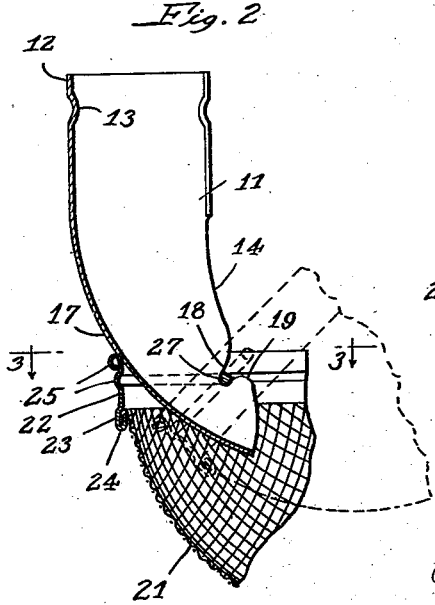
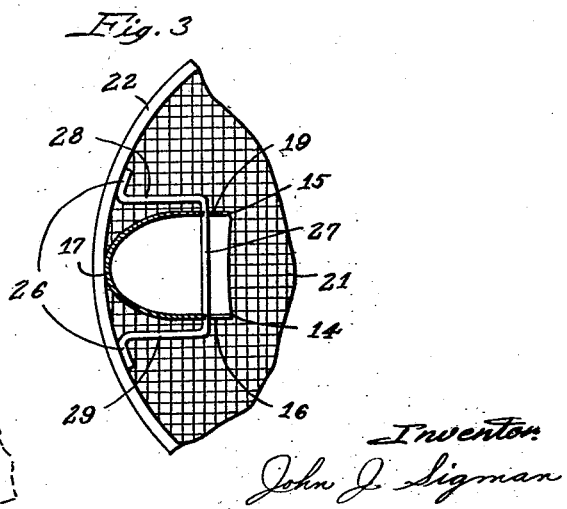
Inventor:
John J. Sigman
By
Wilson, Lowell, McCanna & Wintercorn
Attys.

Patented Nov. 5, 1935

2,019,771

UNITED STATES PATENT OFFICE 2,019,771

JUICE STRAINER

John J. Sigman, Chicago, Ill., assignor to Chicago Flexible Shaft Company, Chicago, Ill., a corporation of Illinois Application May 6, 1933, Serial No. 669,726

7 Claims. (Cl. 210—162)

This invention relates to strainers and more particularly to a juice strainer for the purpose of straining the fruit juices as they flow from the extractor mechanism and contemplates the positioning of a strainer of suitable shape characteristics on the spout of juice extracting devices.

When the juice is extracted from fruits, such as oranges, lemons, and the like, it is customary to ream out the pulp carrying the juices for the purpose of completely breaking up the pulp cells and liberating the juice therefrom. In these operations, a large amount of pulp is liberated and the seeds, together with the pulp, are normally drained off with the juice. When the strainer is provided in the bowl which collects and receives the juice from the reaming operations, the bowl tends to fill up with juice because of the relatively slow rate at which the juice passes through the strainer, the pulp tending to obstruct the passage. This accumulation of juice shortly interferes with the reaming operations so that it is necessary to stop and agitate the contents of the strainer for the purpose of passing the juice therethrough. Consequently, considerable difficulty is experienced with any strainer placed directly in the bowl of the extractor. On the other hand, if the juice is run from the extractor into a receptacle it is subsequently necessary to utilize a second receptacle for the straining operations.

An object of the invention is, therefore, to provide a strainer intermediate the bowl and the receptacle, supported on the spout of the bowl and so positioned that the strainer may be readily removed from the spout and the contents thereof may be manually agitated to carry the juice through the strainer.

Another object is to provide a spout and strainer device wherein the strainer is supported on the spout near one edge in a manner to be readily attached and detached and whereby the strainer is held in position through the force of gravity and is so positioned with respect to the spout as to leave the open side of the strainer substantially unobstructed for access to the material therein.

I have also aimed to provide a device of the character described wherein the strainer is so supported that the normal manipulation of material in the strainer tends to apply forces thereto in conformity with the forces normally holding the strainer in operative position to stablize the strainer under the increased load resulting from such manipulation.

A further object of the invention is the provision of a spout and strainer attachment for juice extractors of simple construction, low in cost, and convenient in operation.

Other objects and attendant advantages will become apparent to those skilled in the art from the following description and the accompanying drawing, in which—

Figure 1 is a side elevation of a fruit juicing machine showing the spout and strainer attached thereto and, in dotted lines, the manner of positioning the strainer;

Fig. 2 is a vertical section through the spout and a portion of the strainer, and Fig. 3 is a section on the line 3—3 of Fig. 2.

While the spout and strainer attachment is adapted for use upon any suitable type of extraction apparatus, I have herein shown it in use upon a combined beater and juice extractor of well known type having a base designated generally by the numeral 4, a pedestal 5 on the base, a motor 6 supported upon the pedestal and carrying a juice extraction bowl 7 having reaming mechanism within the bowl for reaming out the pulp and center portion of citrous fruit. The bowl 7 has a downwardly extending cylindrical outlet 8 through which the juice and pulp is normally discharged to a bowl or other suitable receptacle 9.

A spout 11, best shown in Fig. 2, is in this instance formed of a single piece of sheet metal and has a cylindrical upper end 12 provided with impressed portions 13 arranged for reception in grooves in the bowl outlet 8 to hold the spout onto the bowl. The lower end of the spout is open along its front side, as shown at 14, the metal terminating in spaced front edges 15 and 16, as best shown in Fig. 3. The rear side of the spout is curved toward the front, as shown at 17, for directing the flow of juice arcuately outward. The spaced front edges of the spout are provided with notches 18 providing upwardly extending shoulders 19 adjacent to the lower end of the spout, the notches serving to receive a strainer supporting member presently to be described.

While the strainer may take any number of shapes, we have found it advantageous to provide a semi-spherical screen 21 having a marginal edge 22, the periphery 23 of the screen being secured in the edge or rim 22 in any suitable manner as, for instance, by clamping the rim, as shown at 24. Reenforcing ribs, such as shown at 25, may advantageously be formed in the rim or edge for the purpose of stiffening the sheet metal from which it is made. A strainer supporting member is secured to the rim 22 in any commercially feasible manner, as for example, by welding or soldering, as shown at 26, and consists in this instance of a wire or rod having a bearing portion 27 in spaced relation to the rim 22 and spaced side members 28 and 29 extended from the bearing member 27 to the rim and forming a rectangular wire bracket attached at its ends to the rim. The supporting member extends inward from the rim and in the same plane, the bearing portion 27 thereof lying between the rim and the vertical center line of the screen. The bearing portion 27 is spaced from the rim a distance such that when the bearing member is received in the notches 18, as shown in dotted lines in Fig. 2, and the strainer released so as to rotate about the bearing member until the rim strikes the back of the spout, the strainer will occupy a substantially horizontal position, as shown in Figures 1 and 2. The strainer is thus supported in the notches 18 on the front side of the spout, the curved back side of the spout serving as an abutment for the rim of the strainer. The curved back side of the spout also facilitates the positioning of the strainer on the spout, as will be apparent from the dotted line showing in Fig. 2. The side members 28 and 29 serve to prevent lateral displacement of the strainer with respect to the spout and to maintain a relationship between the spout and strainer such that the spout will always bear against the rim at the point of maximum distance between the bearing portion 27 and the rim, thereby maintaining the strainer in substantially a horizontal position. Shoulders 19 serve to prevent the strainer from sliding out of the notches 18 and also require the outer edge of the strainer to be tilted upward for removal of the strainer from the spout. This movement is opposed to any movement of the strainer which might be imparted in use by manipulation of the material within the strainer.

In use, the juice which is extracted from the fruit in the bowl 7 flows down through the spout 11 and is directed outward substantially to the center of the strainer by the curved wall 17 so that the juice is deposited substantially at the lowest point of the strainer. As a result of this construction, the juice first begins to pass through the strainer at the lowest point and, as the juice and pulp pile up in the container, due to the holes of the strainer being obstructed by the pulp, the juice will pass through the strainer at progressively higher points and will follow the outer surface of the strainer down to the lowest point and there flow from the strainer in a stream. It will thus be seen that from the very first drop of juice delivered into the strainer the juice begins to flow from the lowest point of the strainer so that a relatively small container may be placed under the strainer without danger of the juice missing the top of the container.

Attention is directed to the fact that the strainer is supported adjacent to one side thereof and the connection between the strainer and the spout is such that the strainer is maintained in position through its own weight. Furthermore, it frequently is desirable to agitate the contents of the strainer in order to remove the pulp from the surface of the screen to permit the juice to flow through. This offset relationship of the spout and strainer leaves the open upper side of the strainer substantially unobstructed so that the operator may agitate the contents of the strainer with a spoon or the like. The pressure applied to the screen by such agitation is in a direction opposed to that required for the removal or loosening of the screen so that the act of agitation imparts a moment to the strainer in a direction to facilitate stability of the mechanism.

Attention is directed to the fact that the side portions 28 and 29 together with the shoulders 19, serve to prevent movement of the strainer about its vertical axis of sufficient magnitude to remove the strainer from the spout so that the back and forth movement of a spoon against the bottom of the strainer cannot loosen the strainer from the spout.

An important feature of the invention lies in the simplicity of construction and the ease of operation. It will be seen that all that is required to adapt the spout and a strainer to the invention is the provision of the notches 18 and the bracket formed by the portions 27, 28 and 29. The strainer is positioned on the spout by a single simple movement, such as illustrated in Fig. 2, that is, by tilting the strainer and inserting the bearing portion 27 in the notches 18. Release of the strainer brings it into operative position. Likewise, a reversal of this movement removes the strainer from the spout. The strainer is thus rapidly and conveniently attached and detached from the juicer with a minimum of time and effort, since the spout 11 is normally a conventional part of juicer mechanism.

While I have thus described and illustrated a specific embodiment of my invention, I am aware that numerous alterations, changes and modifications may be made therein without materially departing from the spirit of the invention and the scope of the appended claims, in which I claim:

1. A juice extracting device comprising a strainer, a vertically disposed spout for conducting juice downwardly and laterally into the strainer, the lower end thereof having a convexly curved back, and spaced notches on the opposite side thereof, a supporting element in the strainer spaced from the sides thereof, the curved end of the spout being receivable between the said element and the side and the element being receivable in said notches for the support of the strainer on the spout in a horizontal position, the curved spout directing the juice to the center of the strainer.

2. A juice straining device comprising an arcuate strainer having a rim and an open top, a vertically disposed spout having its lower end extending into the top of the strainer at one side, a supporting member secured to the rim and extending across one side of the spout to normally confine the spout at one side of the strainer by contact thereof against the member and the rim under the weight of the strainer, to support the strainer on the spout.

3. A juice straining device comprising a horizontally disposed strainer having a rim and an open top, a vertically disposed spout having spaced notches on one side and adapted to extend into the strainer adjacent one side thereof, a supporting member secured to the rim and having a horizontally disposed bearing portion spaced from said rim, the bearing portion being receivable in said notches upon tilting of the strainer with the spout occupying a position between said bearing portion and the rim and being held in said notches upon movement of the strainer to a horizontal position.

4. A juice straining device comprising a horizontally disposed strainer having a rim and an open top, a rectangular wire frame within the strainer secured to said rim, a vertically disposed spout receivable within said frame upon tilting of the strainer, the spout having a notched side for reception of a portion of the frame, and a sloping side serving as an abutment for said rim to limit rotation of the strainer on a horizontal axis and to direct juice outward into the strainer.

5. A juice straining device comprising a horizontally disposed strainer having a rim and an open top, a rectangular wire frame within the strainer secured to said rim and having a bearing portion disposed between the rim and the vertical axis of the strainer, a vertically disposed spout receivable within said frame upon tilting of the strainer, the spout having a notched side for reception of the bearing portion of the frame and an opposed sloping side serving as an abutment for said rim to limit rotation of the strainer on a horizontal axis and to direct juice outward into the strainer.

6. A strainer for juice extractors comprising a strainer element of wire mesh, a rim therefor, and a supporting member on the rim extending from the rim inwardly and bent at substantially a right angle in the plane of the rim at a point spaced from the rim.

7. In combination, a spout disposed substantially vertically, a strainer adapted to be detachably supported on the lower end thereof in a substantially horizontal position, said strainer comprising a strainer bowl having a rim, and supporting means comprising a support on the rim arranged to detachably engage means on the outside of the spout so that the strainer is tiltable about said means as a center for attachment to or disengagement from the spout, the support on the rim being spaced therefrom radially inwardly a short distance with relation to the overall width of the strainer to locate the spout in one side of the strainer, and an abutment on the outside of the spout spaced from the aforesaid means on the spout arranged to engage the rim of the strainer when the latter is in substantially horizontal position to limit tilting movement thereof and thereby support the same.

JOHN J. SIGMAN.